(12) United States Patent
Johnson (10) Patent No.: US 9,751,484 B2
(45) Date of Patent: *Sep. 5, 2017

(54) ELECTRONICALLY CONTROLLED IMPACT ATTENUATING FLUID CONTAINING CELLS

(71) Applicant: William R. Johnson, Jacksonville, FL (US)

(72) Inventor: William R. Johnson, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/201,345

(22) Filed: Jul. 1, 2016

(65) Prior Publication Data

US 2017/0006933 A1 Jan. 12, 2017

Related U.S. Application Data

(63) Continuation-in-part of application No. 13/873,178, filed on Apr. 29, 2013, now Pat. No. 9,380,823.

(51) Int. Cl.
| | | |
|---|---|---|
| *A41D 13/015* | (2006.01) |
| *A63B 71/08* | (2006.01) |
| *B60R 21/04* | (2006.01) |
| *B60N 2/42* | (2006.01) |
| *B64D 11/06* | (2006.01) |
| *B60R 21/0132* | (2006.01) |
| *A42B 3/12* | (2006.01) |
| *A63B 71/10* | (2006.01) |
| *A42B 3/04* | (2006.01) |

(52) U.S. Cl.
CPC .............. *B60R 21/04* (2013.01); *A42B 3/046* (2013.01); *A42B 3/121* (2013.01); *A63B 71/081* (2013.01); *A63B 71/10* (2013.01); *B60N 2/42* (2013.01); *B60R 21/0132* (2013.01); *B64D 11/0619* (2014.12); *B60R 2021/0407* (2013.01)

(58) Field of Classification Search
CPC ..... A42B 3/046; A42B 3/121; B29C 45/0053; A41D 13/018; B60R 21/04; A63B 69/004; G06F 3/005
USPC ..... 702/94, 96, 98, 100, 138, 141, 142, 182; 280/730.1, 742; 348/207.1; 428/166; 700/91; 2/412, 413, 425
See application file for complete search history.

(56) References Cited

U.S. PATENT DOCUMENTS 9,380,823 B2 * 7/2016 Johnson ................. A42B 3/121

* cited by examiner

*Primary Examiner* — John H Le
(74) *Attorney, Agent, or Firm* — Mark Young, P.A.

(57) ABSTRACT

A protective device such as a seat or helmet contains impact attenuating fluid (e.g., $CO_2$, Air or Water) containing cells, sensors and electrically actuated exhaust valves for cushioning impact and decelerating a user (e.g., the contacting body part of the user) after an impact. Accelerometers and a pressure sensor supply signals to a microcontroller, which opens an exhaust valve if accelerations (or pressure) exceed a threshold. Expelling fluid provides a cushioning and damping effect, decelerating the wearer's head. Acceleration data, fluid pressure data and GPS position data may be wirelessly communicated to a monitor computer system.

20 Claims, 7 Drawing Sheets

ELECTRONICALLY CONTROLLED IMPACT ATTENUATING FLUID CONTAINING CELLS

RELATED APPLICATION

This application is a continuation in part of U.S. nonprovisional application Ser. No. 13/873,178 filed Apr. 29, 2013, which is a Nonprovisional and claims the benefit of priority of U.S. Provisional Application 61/639,676 filed 27 Apr. 2012, the entire contents of which are incorporated herein by this reference and made a part hereof.

FIELD OF THE INVENTION

This invention relates to impacted structures, such as seats, helmets and dashbords, more particularly, to such a structure with impact attenuating fluid containing cells, sensors and electrically actuated exhaust valves for cushioning impact and decelerating after an impact. Electronic data collection sensors reveal the user's condition, e.g., brain trauma condition under duress, to a medical recording system.

BACKGROUND

As is well known, cushioning and helmets are used to protect a user from injuries. For example, helmets protect the wearer's head by absorbing mechanical energy and preventing penetration. As one example, a conventional modern football helmet is comprised of a hard plastic shell with foam padding on the inside, a face mask made of one or more plastic-coated metal bars, and a chinstrap. Other accessories, such as a visor, may be attached to the helmet.

In professional football and military actions, concussions abound. While the foam padding of conventional helmets provides protection against catastrophic brain injuries, the padding is far less effective at preventing concussions.

As a mild traumatic brain injury, concussion may cause a variety of physical, cognitive, and emotional ailments, which may not become manifest until considerable time has passed. According to research, repeated concussions may substantially increase the risk in later life of dementia, Alzheimer's disease, Parkinson's disease, and/or depression. Many retired professional football players and military personnel suffer from these afflictions today.

Head protection helmets conventionally use polymer foam liners to attenuate impacts and distribute impact forces over larger areas. Helmet liners may use a rigid polymer, a compressible foamed polymer, or a combination of rigid and compressible. Prior art helmet liner systems are normally designed to be durable enough to endure repeated impacts. Helmet shells are thin hard plastic to guard against puncture, cutting or scratching injuries while the foam liners spread the force of impact from the point of impact to a larger area but are not designed to dissipate appreciable amounts of impact energy.

In the event of a vehicle crash, an impulse may radiate through a seat, or an occupant may impact the seat. Serious injuries, including, but not limited to, spine injuries, may result.

Thus, there is a pressing need for an improved shock absorbing active dampening insert for a helmet and a seat (e.g., a vehicle or aircraft seat), that provides enhanced protection against both catastrophic and mild traumatic injury. The invention is directed to overcoming one or more of the problems and solving one or more of the needs as set forth above.

SUMMARY OF THE INVENTION

To solve one or more of the problems set forth above, in an exemplary implementation of the invention, an exemplary impact attenuating system according to principles of the invention contains impact attenuating fluid containing cells, sensors and electrically actuated exhaust valves for cushioning impact and decelerating a user's contacting body parts after an impact. Each cell body, comprised of a flexible plastic, defines a compartment in which a fluid (e.g., $CO_2$, Air or Water) is contained. Each cell body occupies a space between the interior surface of the impacted structure (e.g., a helmet or seat). Accelerometers are attached to each cell (e.g., to opposite sides of each cell). The accelerometers are operably coupled to a microcontroller. An electrically actuated exhaust valve is also operably coupled to the microcontroller. The microcontroller monitors accelerations sensed by the accelerometers. When a sensed acceleration exceeds a determined threshold, the microcontroller opens the exhaust valve. As the user impacts the cell, fluid flows from the cell through the exhaust valve to the atmosphere. The fluid being expelled provides a cushioning and damping effect, decelerating the user. An optional master microcontroller stores acceleration data and communicates the data to a remote computer, either wirelessly or through an I/O port. An optional positioning circuit, such as a GPS receiver, supplies position data to the microcontroller. Acceleration data is associated with the position data for communication to the remote computer.

An exemplary protective device according to principles of the invention includes a structure with a support surface and an contact surface. The user's body contacts at least part of the contact surface. One or more impact attenuating cells is provided against the interior surface of the shell. Each impact attenuating cell includes a cell body. The cell body includes a flexible plastic container comprised of a fluid impermeable material and has an interior compartment for storing a fluid. One or more acceleration sensors is attached to the cell body. An electrically actuated valve or valve assembly such as an array of valves is attached to the cell body. A controller (e.g., microcontroller) operably coupled to the acceleration sensor and to the electrically actuated valve reads the signals from the acceleration sensors, compares the determined acceleration with a threshold acceleration and generates an exhaust signal to open the electrically actuated valve(s) if the determined acceleration is not less than the threshold acceleration. The venting of the fluid through the open valve provides damping and decelerating effects. The impact attenuating cells may includes five impact attenuating cells, which, together, define a substantial portion of the contact surface of the structure. The fluid may be a pressurized gas such as carbon dioxide, nitrogen, or air, or a liquid such as water. An inlet port in each cell body receives the fluid. The inlet port includes a one-way (check) valve configured to allow a fluid to be received in the interior compartment. A pressure sensor in fluid communication with the interior compartment generates a signal representative of sensed pressure of fluid in the interior compartment. The electrically actuated valve assembly responds to an exhaust signal in less than 7 ms. The valves may be microelectromechanical piezoelectric valves, such as microelectromechanical piezoelectric PZT valves.

Each cell may be coupled to a master microcontroller. A positioning module (e.g., a GPS module) may be coupled to the helmet and the master microcontroller. A wireless communications module operably coupled to the master microcontroller wirelessly communicates sensed pressure, acceleration, time and position data to a paired remote computer system.

In an exemplary embodiment, the subject invention includes a plurality of fluid-filled cells, each of which stores fluid until an impact causes a sufficient sensed acceleration or pressure. Each cell is equipped with both an acceleration sensor and an exhaust valve. A controller receives acceleration sensor signals and determines whether to open an exhaust valve for a cell, based upon the determined acceleration. That determined acceleration is local, i.e., specific to each cell. Acceleration, being a vector, includes magnitude and direction. Accelerations can vary considerably in both magnitude and direction from cell to cell. If a determined acceleration exceeds a threshold, the exhaust valve is opened for that cell. In this manner, some cells may be exhausted, while others may not. Only those cells experiencing a sufficient acceleration will be exhausted. Thus, the response of each cell is independent of the response of each other cell. Use of a pre-filled (i.e., filled prior to use) cell, allows greater control over the response of each cell. Cushioning is achieved primarily by controlling discharge of the fluid through each exhaust valve. By way of example, a helmet may contain several cells. If the helmet is struck in the forehead region, the cell(s) against the forehead region may be evacuated. The evacuation cushions the blow. Other cells may remain inflated. This maintains a good fit during use and provides cushioning where needed. Similarly, a seat may contain several cells, for a downward crash such as in helicopter, cells in the base of the seat may be evacuated to provide cushioning, for a forward crash such as in a motor vehicle, cells in the seat back may be evacuated to provide cushioning.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

A device, such as a helmet or seat, according to principles of the invention contains impact attenuating fluid containing cells, sensors and electrically actuated exhaust valves for cushioning impact and decelerating a user (e.g., a user's head or body) after an impact. Each cell body, comprised of a flexible plastic, defines a compartment in which a fluid (e.g., $CO_2$, $N_2$, Air or Water) is contained. Each cell body occupies a space between the contact surface of the device and the user. Accelerometers are attached to opposite sides of each cell. The accelerometers are operably coupled to a microcontroller. An electrically actuated exhaust valve is also operably coupled to the microcontroller. The microcontroller monitors accelerations sensed by the accelerometers. A pressure sensing device is also part of the electronic system. When a sensed acceleration exceeds a determined threshold, the microcontroller opens the exhaust valve. As the user impacts the cell, fluid flows from the cell through the exhaust valve to the atmosphere. The fluid being expelled provides a cushioning and damping effect, decelerating the contacting portion of the user. An optional master microcontroller stores acceleration data and communicates the data to a remote computer, either wirelessly or through an I/O port. An optional positioning circuit, such as a GPS receiver, supplies position data to the microcontroller. Acceleration data is associated with the position data for communication to the remote computer.

Figure 1:
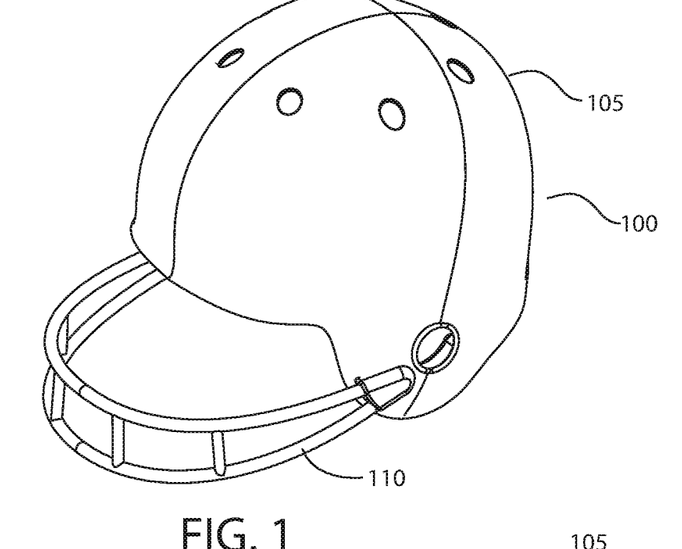
FIG. 1 is a top perspective view of a device equipped with exemplary impact attenuating fluid containing cells according to principles of the invention.
Figure 2:
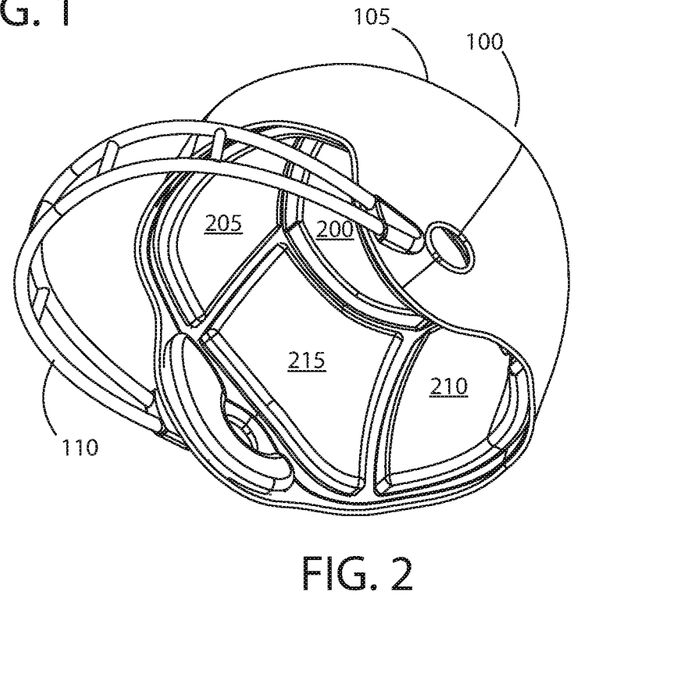
FIG. 2 is a bottom perspective view of a device equipped with exemplary impact attenuating fluid containing cells according to principles of the invention.

Referring to FIG. 1, a top perspective view of an exemplary helmet 100 equipped with exemplary impact attenuating fluid containing cells according to principles of the invention. While a football helmet is shown, the invention is not limited to use with a football helmet. Rather, impact attenuating fluid containing cells may be used in any device that may contain cushioning for comfort or protection, including protection from catastrophic and mild traumatic brain and spinal injuries. Nonlimiting examples of such other devices include military helmets, construction helmets (i.e., hard hats), automotive seats, aircraft seats (including seats in rotary wing aircraft).

The exemplary helmet 100 of FIG. 1 includes a hard protective shell 105 and a face mask 110. These components and additional components, such as a chinstrap, are typical of football helmets. The depicted helmet 100 is a nonlimiting example of protective headgear to which impact attenuating fluid containing cells according to principles of the invention may be adapted.

A conventional helmet contains padding attached to the inner surface of the protective shell 105. In football helmets, conventional padding comprises polymeric foam cushioning material which compresses when struck by a head during impact.

Instead of conventional padding, the present invention employs impact attenuating fluid containing cells, sensors and electrically actuated exhaust valves for decelerating a wearer's head and reducing shock after an impact. Exemplary cells 200, 205, 210, 215, 220 are visible in FIGS. 2 and 4 through 11. The combination of cells is referred to herein as a cell assembly. Each individual cell is referred to as a cell.

The cell assembly protects various areas of the wearer's cranium. The cell assembly includes a front cell 205 that protects the frontal bone portion of the cranium. A back cell 210 protects the occipital portion of the cranium. Left and right side cells 215, 220, which, along with a top cell 200, protect the left and right parietal bones of the cranium. The cells 200, 205, 210, 215, 220 are sized and shaped to fit in the helmet 100 between the wearer's head and the shell 105, in lieu of conventional helmet padding.

In FIGS. 2, 4 and 7 through 11, the shape and size of each exemplary cell 200, 205, 210, 215, 220 are shown. Cell shape and size are determined by dividing the interior surface of the helmet into a plurality of sections. When positioned side-by-side as shown in the Figures, the combination of cells (i.e., the cell assembly) has the shape of the interior of the helmet. The cells 200, 205, 210, 215, 220 overlay most surface area of the interior of the helmet. In the exemplary embodiment, a space or gap is provided between adjacent cells. In an alternative embodiment, opposed edges of adjacent cells may be abutting, with no space between the abutting edges, except for ventilation.

While five cells are shown in the Figures, the invention is not limited to embodiments with five cells. Any number of cells that substantially cover the surface area of the interior of the helmet may be used. Preferably, the number of cells is less than ten, to avoid excessive cost and complexity and to facilitate maintenance and manufacture.

As shown in the Figures, each cell has a shape of a pad. The surface area varies among the cells, except that the left and right side cells 215, 220 have the same surface area. The thickness of the cells is noted as one inch and not controlled by the size of the helmet and the wearer's head. The cells may be round instead of rectangular. The thickness of the cells may be between about 2 to 0.5 inches, preferably about 1.0 inch.

Figure 3:
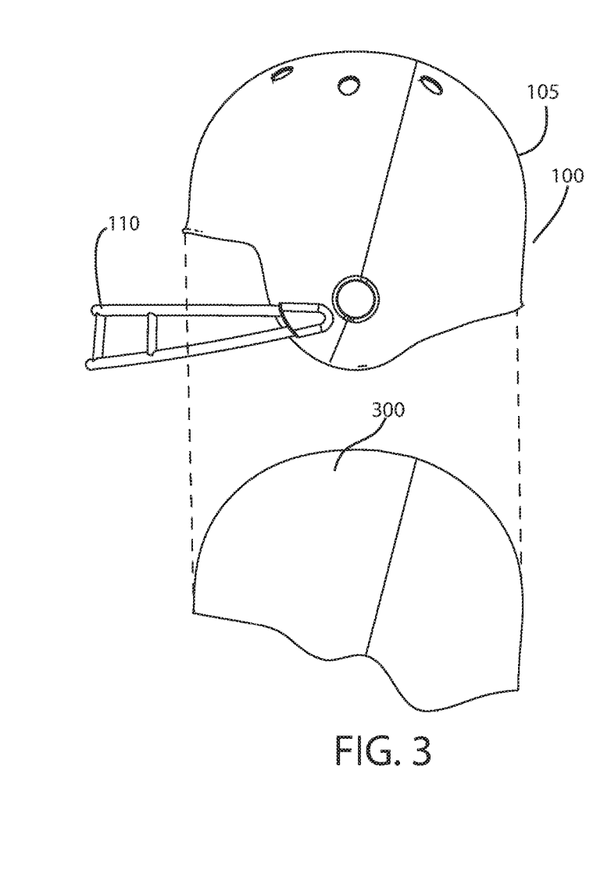
FIG. 3 is a side view of a device and a removed liner that contains exemplary impact attenuating fluid containing cells according to principles of the invention.
Figure 4:
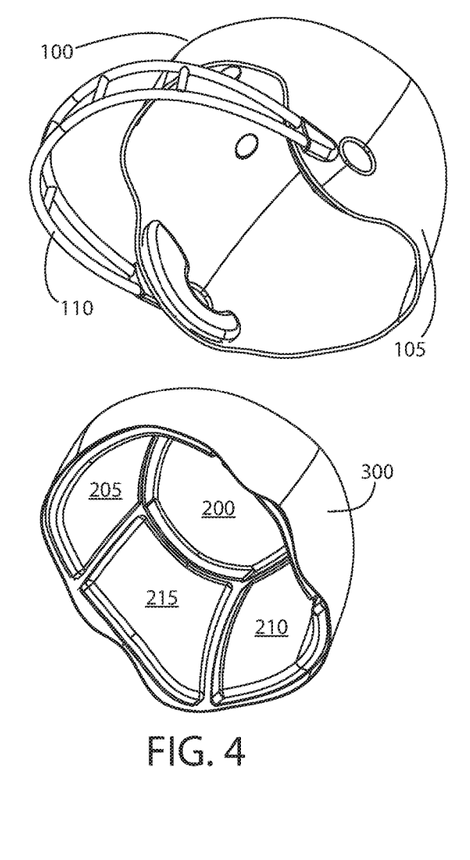
FIG. 4 is a bottom perspective view of a device and a removed liner that contains exemplary impact attenuating fluid containing cells according to principles of the invention.
Figure 5:
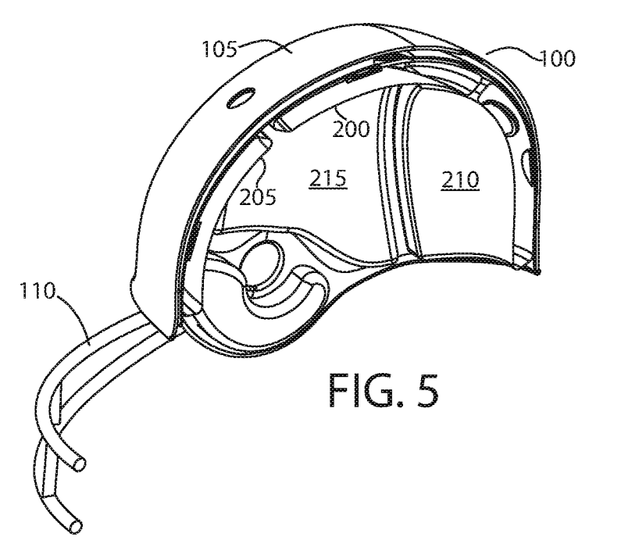
FIG. 5 is a top perspective view of a section of a device equipped with exemplary impact attenuating fluid containing cells according to principles of the invention.
Figure 6:
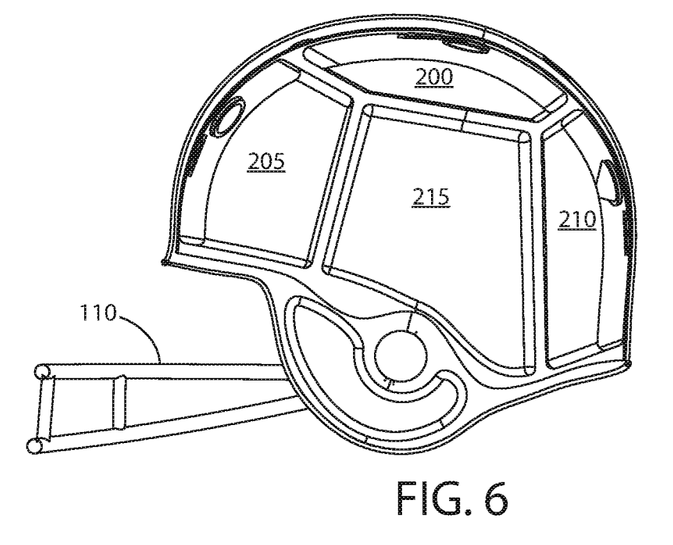
FIG. 6 is a side view of a section of a device equipped with exemplary impact attenuating fluid containing cells according to principles of the invention.
Figure 7:
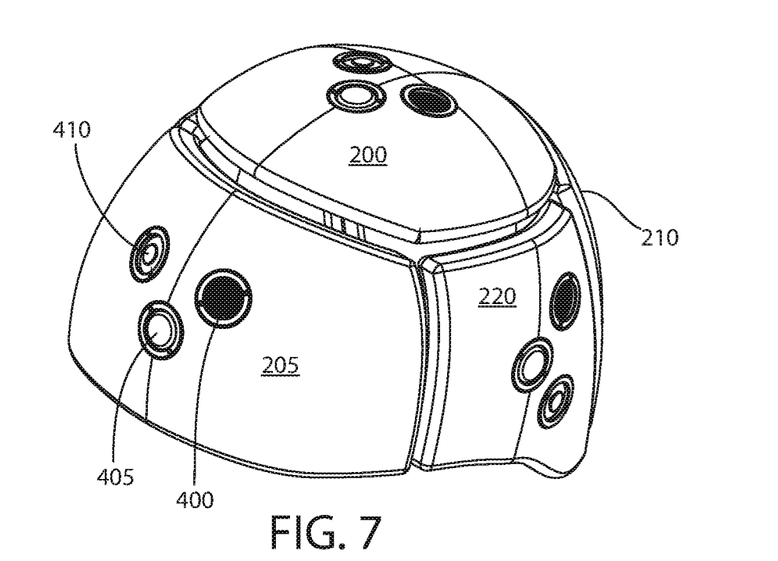
FIG. 7 is a top perspective view of exemplary impact attenuating fluid containing cells for a device according to principles of the invention.

As shown in FIGS. 3 and 4, a liner 300 is provided between the cell assembly and the interior surface of the helmet 100. The liner may be a thin inflatable cushion, a thin foam cushion, or a thin membrane. The liner may be removable or bonded to the interior surface of the helmet.

Each cell comprises a substantially inelastic, fluid-impermeable, thin-walled flexible plastic container. Each cell is made of a top layer and a bottom layer joined together by a continuous side layer. Other constructions of similarly shaped cells are feasible and come within the scope of the invention. Each cell maintains structural integrity, i.e., does not rupture, even after a severe impact. Each cell substantially maintains its shape when filled, i.e., does not substantially stretch out of shape when filled with a fluid to a determined fill pressure. The thickness of the cell can be limited to a desired thickness when filled by providing reinforcing ribs, point welds, and/or quilting seams on the cell.

Figure 8:
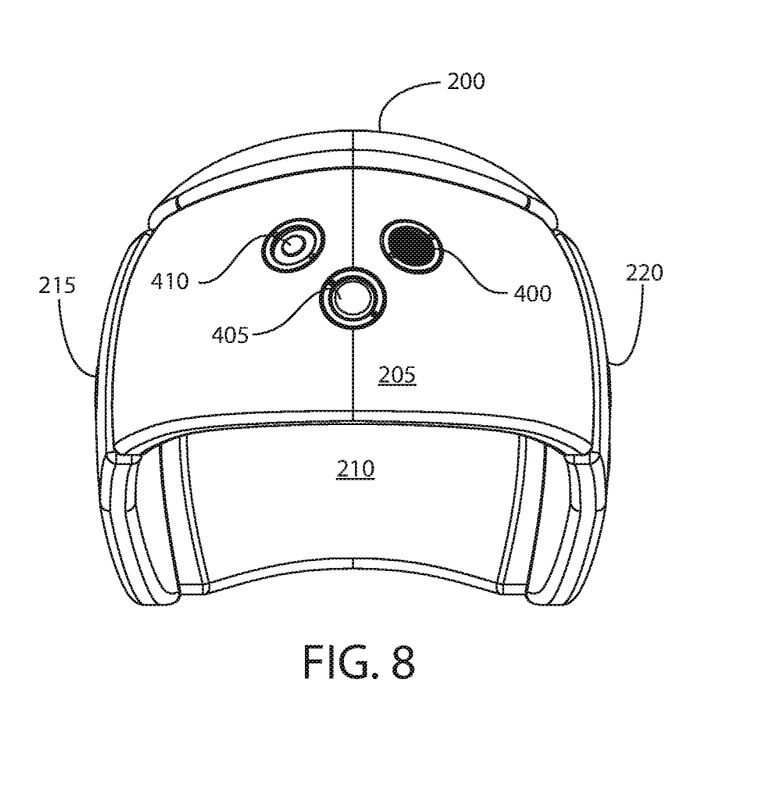
FIG. 8 is a front view of exemplary impact attenuating fluid containing cells for a device according to principles of the invention.
Figure 9:
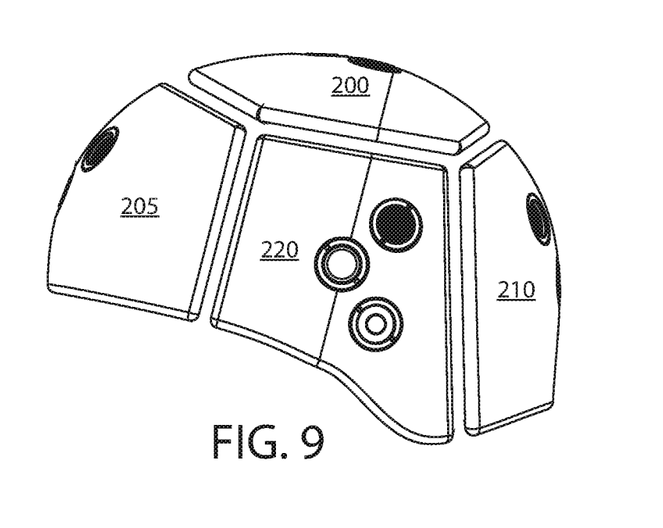
FIG. 9 is a side view of exemplary impact attenuating fluid containing cells for a device according to principles of the invention.
Figure 10:
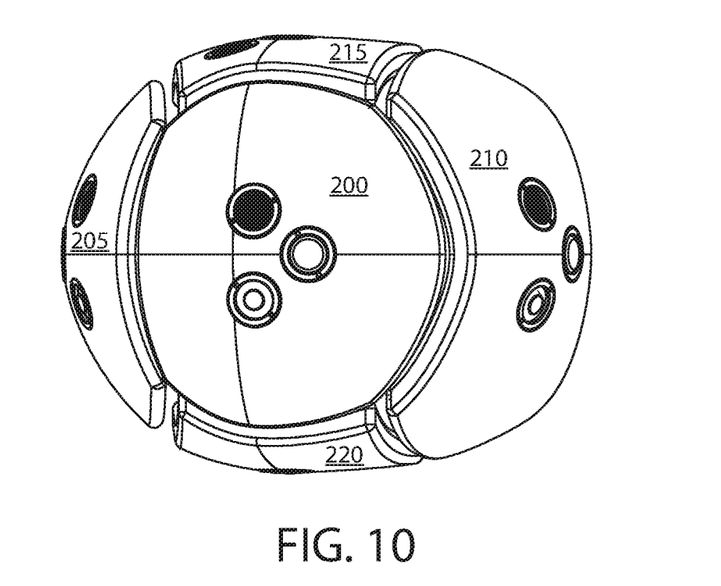
FIG. 10 is a plan view of exemplary impact attenuating fluid containing cells for a device according to principles of the invention.
Figure 11:
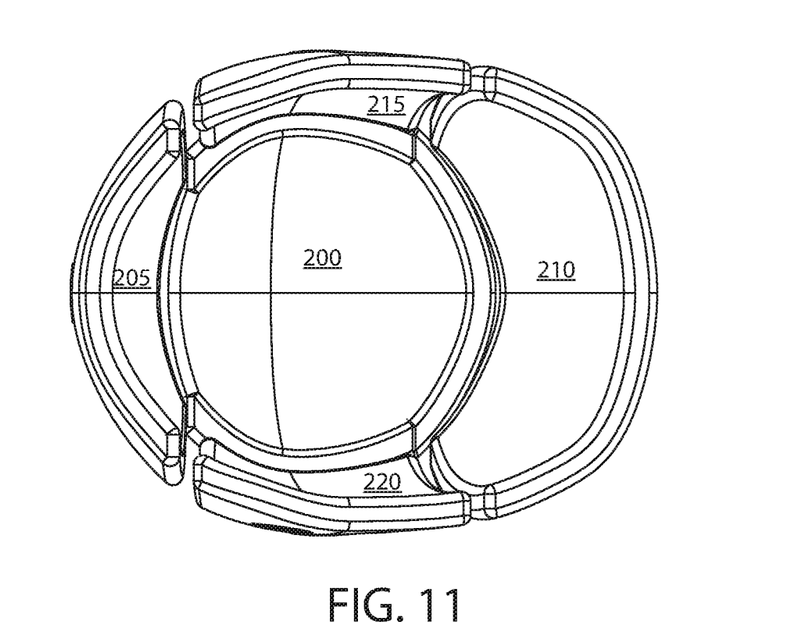
FIG. 11 is a bottom view of exemplary impact attenuating fluid containing cells for a device according to principles of the invention.

As illustrated in FIG. 8, each cell includes components attached to or embedded in the cell surface, such as an accelerometer 410, an exhaust valve 405 and a microcontroller 400. These and other components are discussed more fully below.

A challenge with helmets is minimizing acceleration during an impact, which is usually unpredictable with regard to magnitude and direction. At the time of impact, if the acceleration or deceleration of the head and brain within the skull is severe enough, a concussive injury could result. Conversely, decreasing the degree of acceleration or deceleration of the head and brain at the time of impact reduces the risk of concussive injury. The effectiveness of the present invention is dependent in part upon the venting of fluid upon impact. If a cell collapses too quickly, it could result in a skull fracture or brain injury. If a cell does not collapse enough, a sudden, jolting impact may be experienced.

Figure 12:
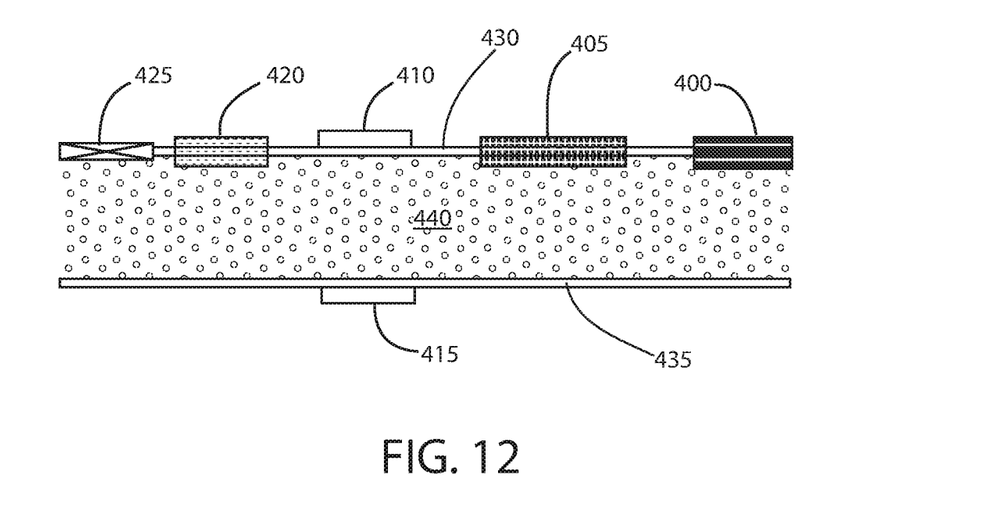
FIG. 12 is a schematic illustrating a section of an exemplary impact attenuating fluid containing cell equipped with sensors and valves according to principles of the invention.

Referring now to FIG. 12, a schematic illustrating a section of an exemplary impact attenuating fluid containing cell equipped with sensors and valves according to principles of the invention is provided. The cell section includes a top layer 430 a bottom layer 435 and a fluid containing space 440 therebetween. A microcontroller 400 may be attached to the top layer 430 of the cell, on the outer surface of the top layer 430, on the inner surface of the top layer, embedded in a storage compartment formed in the top layer 430. An electrically actuated exhaust valve assembly 405 controlled by the microcontroller 400 is also attached at the top layer 430 and is in fluid communication with the fluid containing space 440 and the atmosphere. The exhaust valve assembly 405 is conductively coupled to the microcontroller 400 using wires or traces. A pair of accelerometers 410, 415 or equivalent sensors are attached to the cell. One accelerometer is attached to the top layer 430, while the other is attached to the bottom layer 435. The accelerometers are conductively coupled to the microcontroller 400 using wires or traces. The accelerometers 410, 415, which do not have to be in fluid communication with the fluid containing space 440, may be mounted to the outer surfaces of the top and bottom layers 430, 435. A pressure sensor 420 in fluid communication with the fluid containing space 440 is conductively coupled to the microcontroller 400. A fill port 425 comprises a one-way valve in fluid communication with the fluid containing space 440. The fill port 425 allows the cell to be filled with a gas or liquid 440.

Figure 13:
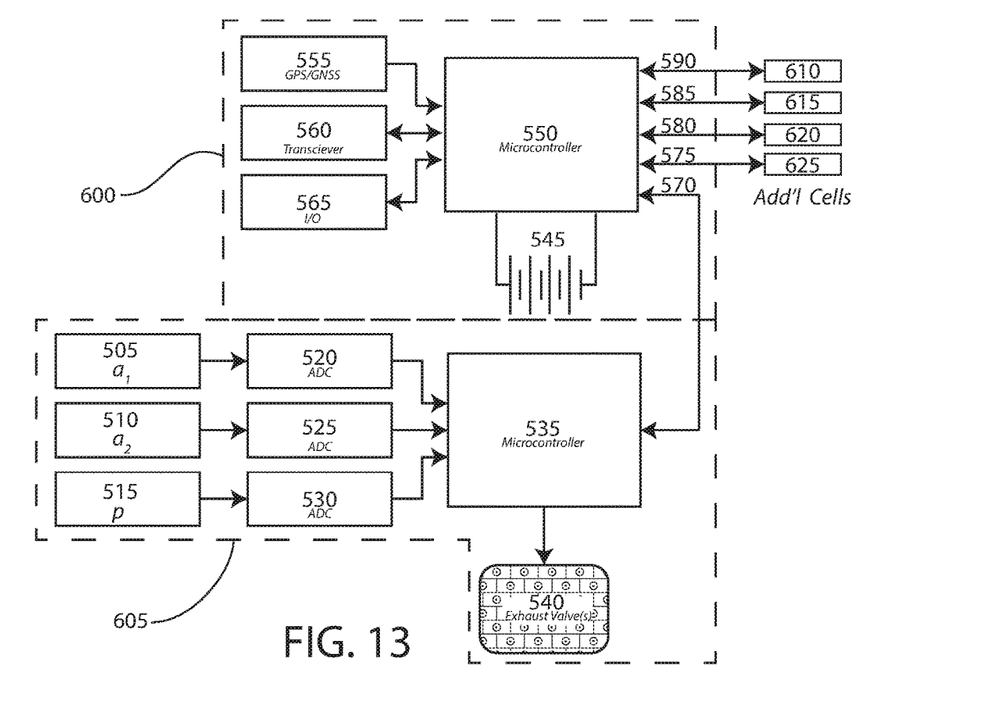
FIG. 13 is a high level block diagram conceptually illustrating electrical components and an electrically actuated valve assembly for an exemplary impact attenuating fluid containing cell according to principles of the invention.

Referring now to FIG. 13, a high level block diagram conceptually illustrates electrical components and an electrically actuated valve assembly for an exemplary impact attenuating fluid containing cell according to principles of the invention. As shown for an exemplary embodiment, each cell includes the components enclosed by dotted line 605. These components are referred to as the cell electronics. Additionally, as an optional feature, the helmet may be further equipped with the components enclosed by dotted line 600. These components are referred to as the helmet electronics. The cell components 605 are attached to a cell 205, 210, 215, 220. When a cell is removed or replaced the corresponding cell components 605 are removed and replaced as part of the cell. The helmet electronics may be disposed between a cell and the interior surface of a helmet. Electronics for other cells, which are the same or substantially the same as the electronics for cell 605, are conceptually represented by additional cells 610-625. Cell electronics 605-625 may be operably coupled to the helmet electronics via wire harnesses with quick connect terminals 570-590, printed traces, or the like.

The exemplary helmet and cell electronics 600, 605 each include a microcontroller 535, 550 which receives, stores and processes signals and data and generates output. Each microcontroller 535, 550 comprises a processor core, memory, and programmable input/output pins. The pins are software configurable to either an input or an output state. When configured to an input state, the pins may be used to read sensors or external signals, such as signals from accelerometers $a_1$ 505, $a_2$ 510 and pressure sensor p 515. If the microcontroller contains an analog-to-digital converter (ADC), one more separate analog-to-digital converters 520, 525, 530 may not be necessary. Each analog to digital converter converts incoming analog signals into a digital form that the microcontroller 535, 550 can recognize. Configured to the output state, the microcontroller 535, 550 pins can drive external devices such as valve assemblies 540. If the microcontroller does not contain a digital-to-analog converter (DAC) that allows the microcontroller to output analog signals or voltage levels, then a DAC would be operably coupled between the microcontroller and the electrically actuated valve assembly 540. In the microcontroller 535, 550 memory may reside a database look-up table for evaluation of sensor data and determining an appropriate response, such as an output to the valve assembly 540.

The cell electronics 605 receive electrical power from one or more disposable or rechargeable batteries 545. If the helmet electronics 600 contain the batteries 545 as conceptually illustrated in FIG. 13, then those batteries may be used to power both the helmet and cell electronics 600, 605.

An electrically activated valve assembly 540 is actuated by the microcontroller 535 to dissipate impact energy by releasing the fluid or media contained in a cell when a severe impact is experienced. The microcontroller 535 of a cell is programmed and configured to open the electrically actuated valve assembly 540 of the cell at an acceleration that is determined to likely be less than that of a concussion generating impact. As an exhaust orifice with a limited area, the open valve assembly 540 restricts fluid flow. The fluid vents to the atmosphere through flow restricting orifice, which dissipates a significant portion of the impact energy and decelerates the wearer's head after an impact. Thus, in response to output from the microcontroller 535, the electronically actuated active valve assembly 540 prevents, allows, and limits flow of fluid/media from the interior compartment of a cell to the atmosphere.

To harness fluid contained in a 1-inch thick cell to cushion a 100 g acceleration, the valve assembly 540 allows substantially all of the fluid contained that is necessary to decelerate the skull/head from contacting the helmet shell to escape in less than about 7 ms. This time estimate can be calculated using Equation 1, shown below, solving for time, t, where the distance, d, is the thickness of the cell, 1-inch, and the acceleration, a, is 100 g. While research suggests that an acceleration less than 100 g may result in concussive injury, the calculation is to estimate the duration of a concussive event, erring on the side of caution. Some university studies consider an 84 g acceleration to be severe enough to cause some players to sustain a concussion. This threshold acceleration may vary from player to player. However, a slight concussion may not be recognizable and a second blow or impact may cause severe brain damage. Additionally, some athlete's don't show signs of a concussion for several hours after an impact to the head. A players or wearer's baseline physiology test is considered additive to the medical data cloud base.

The valve must fully open in a mere fraction of the 7 ms event duration to allow enough time for substantially all of the fluid to vent. A 5"×4"×1" cell contains approximately 20 cubic inches of fluid, which can be substantially exhausted during the 7 ms event. Thus, the valve assembly must accommodate an exhaust flow rate of at least approximately 1.65 cubic feet per second, preferably at least 2 cubic feet per second. The valve assembly must also be compact and durable.

$$d = \frac{1}{2}at^2 \qquad \text{Eq. 1}$$

Thus, the decompression of a cell during an impact event takes place within a few milliseconds to prevent or reduce severity and possibility of a concussion.

In an exemplary embodiment, the valve assembly is comprised of one or more microfluidic valves. In a particular preferred embodiment, the valve assembly is comprised of a plurality of microelectromechanical systems (MEMS) valves. By way of example and not limitation, the valve assembly may comprise an array of piezoelectric MEMS valves, each valve having an electrically controlled actuator that provides sufficient displacement of a valve seat to a completely open, partially open and close the valve. Certain crystalline materials, such as quartz, lead titanate zirconate (PZT), and zinc oxide (ZnO), exhibit an electrical polarization under mechanical strain due to a relative displacement of negative and positive charge centers in the material's microstructure, a phenomenon called piezoelectricity. This behavior can be leveraged for actuation, since an applied electric field will in turn induce mechanical deformation. The stroke and force of the deformation may be amplified using any of various mechanical and/or fluid amplification mechanisms.

As a single MEMS valve may not enable an adequate flow rate, a plurality of MEMS valves in an array may be utilized to achieve the desired flow rate. Thus, the valve assembly 540 conceptually illustrated in FIG. 13 broadly represents both a single electrically actuated valve as well as a plurality of electrically actuated or mechanical valves. The filled pressure is sufficient to provide a cushioning effect during normal use and when a slight impact is encountered. However, when a substantial impact is encountered, the outlet valve opens and provides a flow restricting orifice.

A pressure sensor 515 in each cell senses the fluid pressure. The sensed pressure is used by the microcontroller 535 to determine the fill state of a cell. The sensed pressure is also used by the microcontroller 535 to determine whether fluid is leaking from a cell. The sensed pressure is also used by the microcontroller 535 to determine the pressure surge upon impact.

The fluid 440 in each cell is pre-charged to a certain pressure for each individual player according to the player's head weight (e.g., typically about 11 pounds) and other factors. Fluid is supplied through the fill port 425. The fluid-filled cell absorbs the head mass impact energy by the head compressing the cells and by bleeding off fluid through a modulating exhaust valve. This charge pressure may be based on the impact load distribution area. The cell pressure pre-loading may be performed by a closely calibrated and computer controlled pump on the sidelines. A computer controlled charging station may include a computer-controlled pump and a programmed computer registering all players with historic data. The computer controlled charging station charges the players helmet to his predetermined pressure. This fluid enters the helmet through a charging valve (i.e., an inlet valve) in each cell of the helmet.

A communications module 560 comprised of a transceiver and antenna wirelessly communicates data, such as sensed accelerations and pressures, as well as position and time, to a compatible computer, such as a sideline computer. The data can be analyzed, stored and displayed on the sideline computer. The transceiver may operate in conjunction with a communication standard such as 802.11, Bluetooth, 802.15.4 standard running a ZigBee or other protocol stack, ultra-wideband, RFID, IrDA, Wimax or other standard short or medium range communication protocol, or other protocol.

A position determination module 555 such as a GPS or differential GPS (DGPS) may be provided as part of the helmet electronics. Additionally, GPS data may be used to determine a player's speed and direction of travel at the time of an impact event. Thus, acceleration and pressure data for an impact event, time of the event, position (i.e., location) where the event occurred, and speed and direction of travel may be recorded for each cell of a helmet at the time of an impact event.

An interface 565 is provided in the helmet electronics to physically and communicatively couple the helmet electronics to another computer or peripheral device. By way of example and not limitation, the interface 565 may be a mini or micro universal serial bus port operably coupled to the microcontroller of the helmet electronics. The interface enables data transfer, configuration, testing and programming and player's vital signs.

A user input mechanism such as a user activated switch (e.g., a key switch) allows a person to reset the system after a fault, set parameters and program the microcontroller.

Optional features include an audio output device (e.g., a speaker) and a visible output device (e.g., an LED) to signal a fault, such as a pressure loss or concussive impact.

An example sideline module is an electronic data gathering and display device incorporated into a portable enclosure that is easy for a coach, trainer, or other such game official to carry, consult, and interact with during the activities of the practice or game. The sideline module may be in the form of any electronic receiving device, including laptop or tablet computers, mobile phones, or any other such device configurable to receive wireless information and/or to connect to the helmet through an interface. The sideline module may produce audible, visible and/or vibratory alert signals to call attention to the arrival of certain or all new data in real-time. In one embodiment, the sideline module may classify incoming impact data into categories, indicating differing levels of concern and differing levels of urgency of response and wearers vital signs sensors.

In some embodiments, some or all of the helmet and cell electronics may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Thus, by way of example, one or more of the microcontrollers 535, 550 can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory.

The microcontrollers 535, 550 may contain one or more memory modules. Additionally, the helmet electronics may contain additional memory, such additionally read-only memory, random access memory, volatile memory, non-volatile memory, static memory, dynamic memory, flash memory, cache memory, and/or any device that stores digital information.

In an exemplary embodiment, the subject invention includes a plurality of fluid-filled cells, each of which stores fluid until an impact causes a sufficient sensed acceleration or pressure. Each cell is equipped with both an acceleration sensor and an exhaust valve. A controller receives acceleration sensor signals and determines whether to open an exhaust valve for a cell, based upon the determined acceleration. That determined acceleration is local, i.e., specific to each cell. Acceleration, being a vector, includes magnitude and direction. Accelerations can vary considerably in both magnitude and direction from cell to cell. If a determined acceleration exceeds a threshold, the exhaust valve is opened for that cell. In this manner, some cells may be exhausted, while others may not. Only those cells experiencing a sufficient acceleration will be exhausted. Thus, the response of each cell is independent of the response of each other cell. Use of a pre-filled (i.e., filled prior to use) cell, allows greater control over the response of each cell. Cushioning is achieved primarily by controlling discharge of the fluid through each exhaust valve. By way of example, a helmet may contain several cells. If the helmet is struck in the forehead region, the cell(s) against the forehead region may be evacuated. The evacuation cushions the blow. Other cells may remain inflated. This maintains a good fit during use and provides cushioning where needed. Similarly, a seat may contain several cells, for a downward crash such as in helicopter, cells in the base of the seat may be evacuated to provide cushioning, for a forward crash such as in a motor vehicle, cells in the seat back may be evacuated to provide cushioning.

In another embodiment, a plurality of vital signs sensors are operably coupled to the helmet microcontroller. The vital signs sensors develop sensor signals representative of physiological characteristics of a wearer. Vital signs data may then be wirelessly communicated to a remote computer, such as a sideline monitoring station. The vital signs sensors may be attached to one or more cells, a facemask, a visor, an earpiece in a helmet, and/or a mouthpiece communicatively tethered to the microcontroller with a cable or other conductive path. The vital signs sensor may monitor body temperature, pulse rate (or heart rate), blood pressure, respiratory rate, oxygen saturation, pulse oximetry, neural oscillation, pupil size, equality, and reactivity to light. Thus, physiology may be monitored before, during and after an impact event.

In one exemplary embodiment, there is no determination to open a valve unless there is an impact, crash or blast force condition. The various functions of the mitigation systems provide multiple levels of control. Each cell may communicate with each other cell to handoff information of the impact event according to magnitude and direction of sensed acceleration.

If there is a rotational impact each cell will transfer to the next cell control data. Each cell may contain a microprocessor which controls that cell's exhaust valve, pressure sensor and accelerometers input. In such a configuration, a supervisory microprocessor which has the initial programming and baseline settings will monitor and execute changes to each individual cell's microprocessor.

An exhaust valve is molded into the gas cushion and its discharge will be to the support structure side of the cushion. An exemplary valve is approximately one inch square by one quarter inch thick. Such exhaust valve is a piezo electric device made of ceramic material with two leads for activation.

The electronics accelerometers and pressure sensor will work in conjunction with each cell's microprocessor to modulate the exhaust valve to afford a deceleration of the impact momentum yielding optimum user protection. The impact momentum will be captured within two milliseconds and the transient time period will be extended to allow for a soft landing.

In one embodiment, a supplemental gas supply (e.g., pressurized container) replenishes exhausted gas, as the gas is exhausted, to prolong impact impact attenuation. A pressure sensitive and/or electronically controlled valve controls flow from the gas supply through a manifold with supply lines connecting to each inlet valve of each cell.

An exemplary cell is 20 cubic inches in volume and contains $CO_2$ gas at 26 PSI pre-charge. Attached to each exemplary cell are one or more tri-axial accelerometers. There are at least two valves per gas cushion, one for filling or pre-charging the cushion with fluid and one variable orifice piezoelectric valve for fluid discharge. In addition to the accelerometers and valves there may be at least one pressure sensor.

To control each cell there may be one microcontroller for control of the exhaust valve. Each cell may have a microcontroller which may be coupled to a supervisory microcontroller which controls and monitors the complete system of cells.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A protective device, said protective device comprising
   a support structure, and
   a plurality of impact attenuating cells, each impact attenuating cell being against the support structure, each impact attenuating cell comprising:
   a cell body, said cell body comprising a flexible plastic container comprised of a fluid impermeable material and having an interior compartment storing a fluid, said fluid filling the interior compartment, and
   at least one acceleration sensor attached to said cell body, and
   at least one electrically actuated exhaust valve attached to said cell body, and
   a controller operably coupled to each acceleration sensor attached to each cell body, and the controller being operably coupled to each electrically actuated exhaust valve attached to each cell body, each acceleration sensor producing a signal in response to an acceleration, and said controller:
   determining, for each acceleration sensor, an acceleration from the signal produced by each acceleration sensor, said acceleration being the determined acceleration, and
   comparing the determined acceleration, for each acceleration sensor, with a threshold acceleration for each acceleration sensor, and
   generating an exhaust signal to open the electrically actuated exhaust valve for each cell body with an acceleration sensor for which the determined acceleration is not less than the threshold acceleration.

2. A protective device according to claim 1, said plurality of impact attenuating cells covering a substantial portion of the support structure.

3. A protective device according to claim 1, said plurality of impact attenuating cells comprising at least three impact attenuating cells which, together, cover a substantial portion of the support structure.

4. A protective device according to claim 1, said plurality of impact attenuating cells comprising at least four impact attenuating cells which, together, cover a substantial portion of the support structure.

5. A protective device according to claim 1, said plurality of impact attenuating cells comprising at least five impact attenuating cells which, together, cover a substantial portion of the support structure.

6. A protective device according to claim 1, each impact attenuating cell further comprising an inlet port for receiving a fluid, said inlet port including a one-way valve configured to allow a fluid to be received in the interior compartment.

7. A protective device according to claim 1, each impact attenuating cell further comprising a pressure sensor in fluid communication with the interior compartment, operably coupled to the controller, and generating a signal representative of sensed pressure of fluid in the interior compartment, and said controller determining the sensed pressure from the signal produced by the pressure sensor.

8. A protective device according to claim 1, said cell body including a first layer facing the support structure and an opposite second layer, and
   said at least one acceleration sensor attached to each cell body comprising a pair of acceleration sensors, including a first sensor attached to the first layer of the cell body and a second sensor attached to the second layer of the cell body.

9. A protective device according to claim 1, each acceleration sensor comprising an accelerometer.

10. A protective device according to claim 1, said at least one electrically actuated exhaust valve attached to said cell body comprising a valve assembly capable of reacting in less than 7 ms.

11. A protective device according to claim 1, said at least one electrically actuated exhaust valve attached to said cell body comprising a valve assembly capable of exhausting substantially all fluid from the interior compartment in less than 7 ms.

12. A protective device according to claim 1, said at least one electrically actuated exhaust valve attached to said cell body comprising a plurality of valves.

13. A protective device according to claim 1, said at least one electrically actuated exhaust valve attached to said cell body comprising a piezoelectric valve.

14. A protective device according to claim 1, said at least one electrically actuated exhaust valve attached to said cell body comprising a piezoelectric PZT valve.

15. A protective device according to claim 1, said at least one electrically actuated exhaust valve attached to said cell body comprising a plurality of piezoelectric valves.

16. A protective device according to claim 1, said at least one electrically actuated exhaust valve attached to said cell body comprising a plurality of piezoelectric PZT valves.

17. A protective device, said device comprising
- a support structure, and
- a plurality of removable, replaceable, refillable, impact attenuating cells against said support structure, said plurality of impact attenuating cells including a first cell, a second cell, a third cell, and a fourth cell, which, together, cover a substantial portion of the support structure, each of said impact attenuating cells comprising
- a cell body, said cell body comprising a flexible plastic container comprised of a fluid impermeable material, having an interior compartment for storing a fluid, and including a first layer facing the support structure and an opposite second layer, and
- an inlet port formed in the cell body for receiving a fluid, said inlet port including a one-way valve configured to allow a fluid to be received in the interior compartment of the cell body, and
- a pair of acceleration sensors attached to the cell body, and including a first sensor attached to the first layer of the cell body and a second sensor attached to the second layer of the cell body, and
- an electrically actuated exhaust valve assembly attached to said cell body in fluid communication with said interior compartment and configured to allow the fluid to vent from the interior compartment of the cell body, and
- a pressure sensor in fluid communication with said interior compartment, operably coupled to the controller, and generating a signal representative of sensed pressure of fluid in the interior compartment, and
- a controller operably coupled to each of the pair of acceleration sensors and to said electrically actuated exhaust valve assembly, said acceleration sensors producing a signal in response to an acceleration, and said controller:
- determining, for each impact attenuating cell, the acceleration from the signals produced by the acceleration sensors, and
- comparing the determined acceleration, for each impact attenuating cell, with a threshold acceleration, and
- generating an exhaust signal to open said electrically actuated exhaust valve, for each impact attenuating cell for which the determined acceleration is not less than the threshold acceleration, and
- determining the sensed pressure, for each impact attenuating cell, from the signal produced by the pressure sensor.

18. A protective device according to claim 17, further comprising master microcontroller communicatively coupled to the controller of each cell, a wireless communications module operably coupled to the master microcontroller and configured to wirelessly communicate sensed pressure and acceleration data to a paired remote computer system.

19. A protective device according to claim 18, further comprising a positioning module configured to receive satellite signals for determining global position upon the sensing of pressure and acceleration, said positioning module being operably coupled to the master microcontroller, and said master microcontroller communicating to a paired remote computer system the determined global position of the helmet for the pressure and acceleration data.

20. A protective device according to claim 19, said electrically actuated exhaust valve of each cell comprising a plurality of piezoelectric valves.

* * * * *